United States Patent

[11] 3,566,902

| [72] | Inventor | John T. Muller |
| | | Nutley, N.J. |
| [21] | Appl. No. | 728,580 |
| [22] | Filed | May 13, 1968 |
| [45] | Patented | Mar. 2, 1971 |
| [73] | Assignee | Leslie Company |
| | | Lyndhurst, N.J. |

[54] FLUID FLOW SYSTEM
4 Claims, 16 Drawing Figs.

[52] U.S. Cl. .................................................. 137/100,
137/501, 137/605, 138/45
[51] Int. Cl. ........................................................ G05d 11/00
[50] Field of Search ........................................... 137/98,
100, 501, 605, 500, 504; 138/45

[56] References Cited
UNITED STATES PATENTS
2,255,787  9/1941  Kendrick ..................... 137/501X
2,775,259 12/1956 Stiebel .......................... 137/605X
2,937,658  5/1960  Stewart ......................... 138/45
2,941,544  6/1960  Peras ............................ 138/45X
2,942,619  6/1960  Jackson ........................ 137/501
3,232,336  2/1966  Leslie et al. ................... 165/38
3,415,264 12/1968  Brown et al. .................. 137/92
FOREIGN PATENTS
490,607  8/1938  Great Britain ................ 137/100

*Primary Examiner*—William F. O'Dea
*Assistant Examiner*—David J. Zobkiw
*Attorney*—Pennie, Edmonds, Morton, Taylor and Adams

ABSTRACT: In a fluid flow system having at least two flow branches whose pressure drop variations with flow rate changes are different, a flexible orifice is placed in a branch with the lesser pressure drop. The pressure drop across this orifice, which expands with increasing flow rate, tends to balance the pressure drop in the other branch or branches so as to make possible predetermined control of the fluid flow in the system.

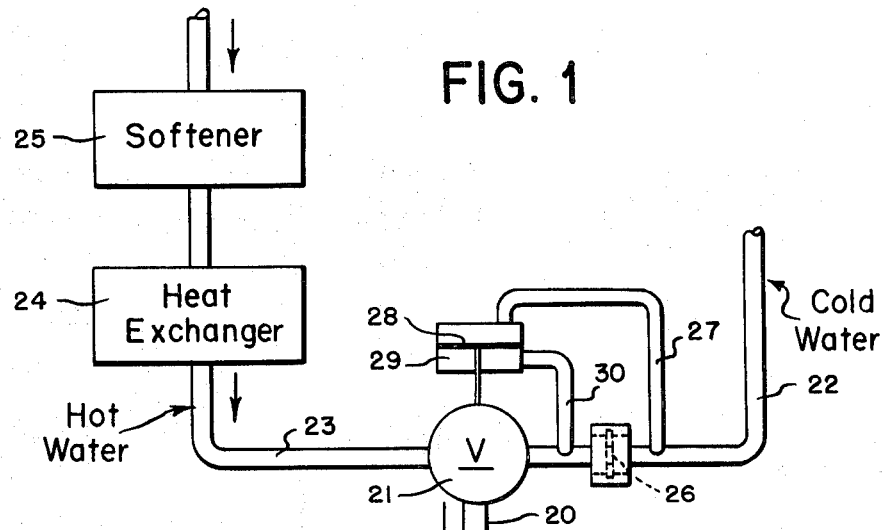
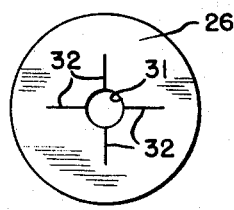
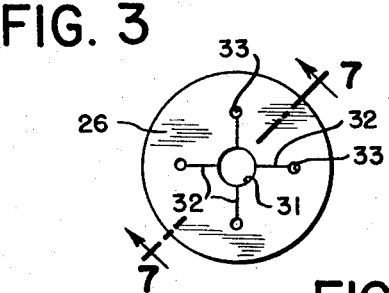
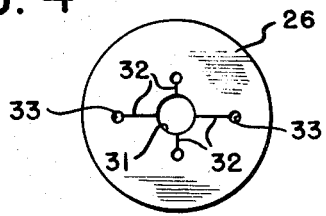
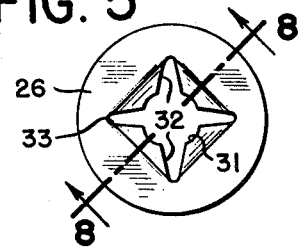
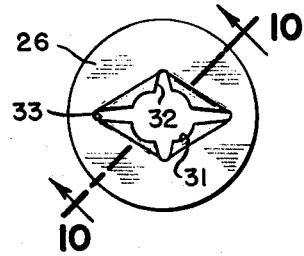
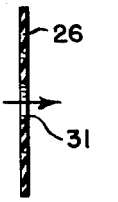
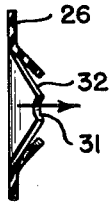
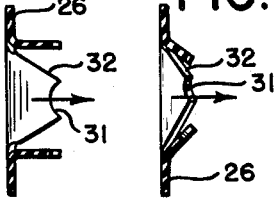
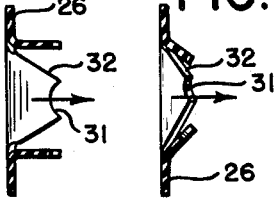

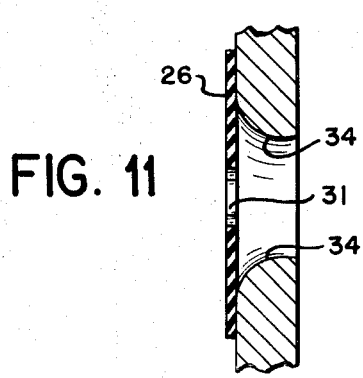
FIG. 11
FIG. 12
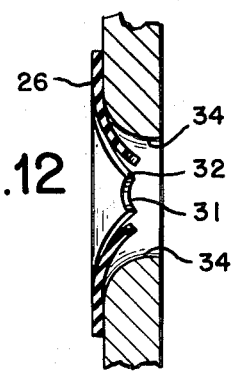
FIG. 13
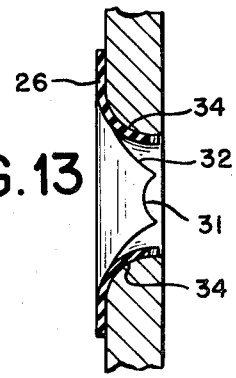
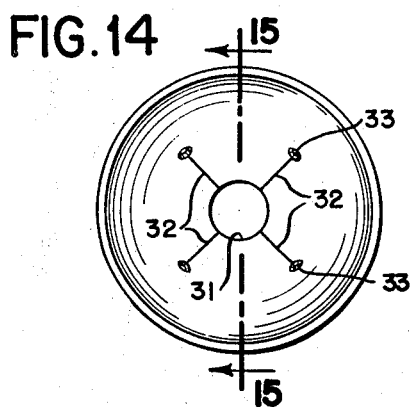
FIG. 14
FIG. 15
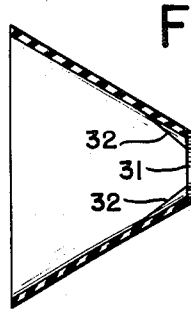
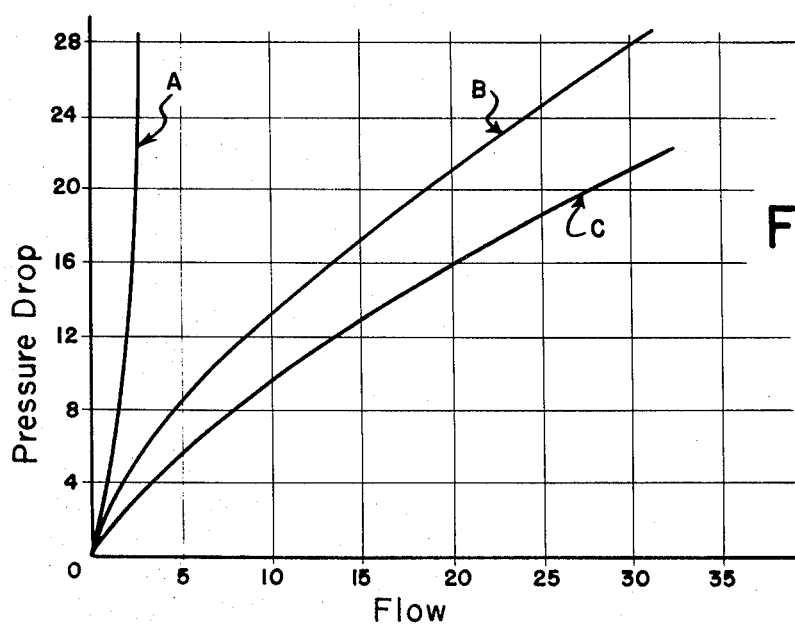
FIG. 16

FLUID FLOW SYSTEM

This invention relates to fluid flow systems and, more particularly, to control of the flow through branches of such a system which have different pressure drop variations with fluid flow rate changes.

In fluid flow systems such as those for the blending of two identical fluids in a desired ratio as in the blending of hot and cold water, or for the controlled flow of different reagent fluids in chemical processing, or in systems where a characteristic flow through one branch should be related to the flow through another branch, it is frequent that the resistances to fluid flow in the separate branches are different. Consequently, as the flow rates in two or more branches of such flow systems increase, their pressure drops differ from one another. When this has happened heretofore, separate monitoring and balancing of the pressure has been required in the several branches in order to control their flows to the desired extent.

Pursuant to the present invention, a simple self-adjusting orifice can be inserted in one of the flow branches to establish for that branch a flow rate:pressure drop relationship having any desired characteristic with respect to that of another branch so as to facilitate control of the branches. Thus, the invention is applicable to a fluid flow system having at least two flow branches, one of the branches having a significantly greater flow resistance than another branch. The system further includes a flow control valve for maintaining a predetermined fluid flow through a branch of the system and a pressure-sensitive element associated with this flow control valve. In accordance with the invention, a flexible orifice-forming element is positioned in a relatively low flow resistance branch of the system in the path of fluid flow, a first pressure-sensing line is connected to the system branch on the upstream side of the orifice, a second pressure-sensitive line is connected to the system on the downstream side of the orifice, and pressure-differential sensing means is connected to the two pressure-sensing lines for sensing the differential in pressure therebetween as the pressure which operates the aforesaid pressure-sensitive element.

These and other novel features of the fluid flow system of the invention will be more readily understood from the following description taken in conjunction with the accompanying drawings in which:

FIG. 1 is a schematic diagram of an illustrative fluid flow system embodying the invention;

FIG. 2 is a front view of a representative flexible orifice-forming element pursuant to the invention;

FIGS. 3 and 4 are front views of additional variations of flexible orifice-forming elements;

FIGS. 5 and 6 are front views of the orifice-forming elements shown in FIGS. 3 and 4, respectively, when these elements are distorted by a medium fluid flow rate to provide an enlarged orifice;

FIG. 7 is a cross section of the orifice-forming element shown in FIG. 3 taken along line 7-7;

FIG. 8 is a cross section of the orifice-forming element shown in FIG. 5 taken along line 8-8;

FIG. 9 is a cross section of the orifice-forming element shown in the preceding FIGS. 7 and 8 when subjected to maximum fluid flow rate;

FIG. 10 is a cross section of the orifice-forming element shown in FIG. 6 when subjected to a medium fluid flow rate;

FIGS. 11, 12 and 13 are cross sections of an orifice-forming element such as that shown in FIG. 2 when backed by a restrictive throat and under no-flow, medium-flow and maximum-flow conditions, respectively;

FIG. 14 is a front view of a frustoconically shaped orifice-forming element embodying the invention;

FIG. 15 is a cross section taken along line 15-15 in FIG. 14; and

FIG. 16 depicts the pressure drop vs. flow curves obtained by the use of different flexible orifice-forming elements such as those shown in the drawings.

The embodiment of the invention shown in FIG. 1 is one in which a demand line 20 of uniformly tempered warm or hot water is made available by control of a blending valve 21 which so proportions a supply 22 of cold water and a supply 23 of hot water as to provide the temperate water regardless of the fact that the initial supply of hot water from a heat exchanger 24 may have a considerably higher temperature than that which it supplies after steady-state flow of water through the exchanger has been established. The heat exchanger presents a relatively high flow resistance and causes some pressure drop in the water flowing through it, and an even greater resistance, and resulting greater pressure drop with increasing flow rate, is caused by a water softener 25 in the cold water supply line to the heat exchanger.

If the proportioning of hot and cold water by the blending valve 21 is controlled by sensing the pressure differential between that if the warm water demand line 20 and the cold water supply line 22 as in the U.S. Pat. to Leslie and Muller No. 3,232,336, the measured pressure differential will not be representative of the pressure of the hot water supply to the blending valve because of the relatively great pressure drop attributable to the flow resistance offered by the heat exchanger and the water softener. Similarly, if the blending valve were controlled by the differential in pressure between the warm water demand line and the hot water supply line, this differential would not be representative of the pressure in the cold water supply line to the blending valve.

Pursuant to the present invention, a flexible orifice-forming element 26 is positioned in a relatively low flow resistance branch of the system, to wit, in the cold water line 22 of the embodiment shown in FIG. 1. As shown in FIGS. 7, 8 and 9, respectively, this orifice has a definite at-rest size under no-flow condition, but has a larger size under medium flow-rate condition and a still larger size under maximum flow-rate condition in the cold water line. Inasmuch as a large orifice size produces a smaller drop across the orifice than a small orifice at any given flow-rate, the progressive increase in size of the flexible orifice with increasing flow-rate produces a progressively smaller increase in pressure drop across the orifice with increasing flow-rate. This flattened pressure drop vs. flow rate curve, it will be appreciated, is typical of the relationship between pressure and flow-rate in the hot water line due to the increasing pressure drop with increasing flow-rate through the relatively high flow resistance water softener 24 and heat exchanger 25 in the hot water supply line 23. Thus, by providing a pressure-sensing line 27 from a point in the system on the upstream side of the flexible orifice (i.e., from the cold water supply line 22 in FIG. 1) to one side of a diaphragm 28 of a blending valve control element 29 and by providing a pressure-sensing line 30 from another point in the system on the downstream side of the flexible orifice (i.e., from the cold water supply line 22 between the orifice 26 and the blending valve 21, or from the temperate water supply line output from the blending valve) to the other side of the control element diaphragm 28, the differential pressure across the diaphragm will increase relatively slowly with increasing flow rate as will the pressure in the hot water supply line.

The rate of change of pressure drop across the flexible orifice with increasing flow rate can be controlled at will by choice of flexibility of the orifice-forming material and by design of radial slits or the like extending outwardly from the central opening of the orifice. The flexibility of the orifice material will vary with the nature of this material and with its thickness. For example, natural or synthetic rubber, both plain and fabric-reinforced, and other elastomers such as polypropylene and the like, can be used as the body material of the flexible orifice. The design of the flexible orifice-forming element 26 can be varied by an infinite combination of the size of its central opening 31 and slits 32 of identical or different lengths with or without terminal cross-slits or openings 33 as shown in FIGS. 2 through 15. If desired, the maximum opening size of any flexible orifice can be established by providing the downstream side of the body portion of the orifice with a restraining wall or shoulder 34 as shown in FIGS. 11, 12 and 13.

By any one or a combination of these expedients, the rate of change of the orifice opening size with increasing flow-rate, from any desired minimum to any desired maximum, can be obtained so as to produce pressure drop vs. flow-rate characteristics illustrated by, but not limited to, the curves A, B and C in FIG. 16. In this way, a pressure drop characteristic in one branch of a fluid flow system can be made to be the same as, or have any predetermined relation to, the pressure drop characteristic of another branch of that system.

It will be appreciated that the use of a flexible orifice pursuant to the present invention is not limited to an embodiment such as that shown in FIG. 1 and that it is useful in any fluid flow system, whether for gas or liquid and whether for identical or different fluids in the separate branches, and regardless of the number of such branches whose flow or pressure drop characteristics are to be regulated or established in some predetermined manner or relationship.

I claim:

1. In a fluid flow system having at least two flow branches, a first one of the branches having a significantly greater flow resistance than a second branch, a blending flow control valve interconnecting and providing a common discharge for said flow branches and maintaining a predetermined fluid flow through said second branch with relation to the flow through said first branch of the system, and a pressure-sensitive element for operating the blending flow control valve responsive to pressure in said second branch, the improvement which comprises a flexible orifice-forming element positioned in a relatively low flow resistance portion of said second branch of the system in the path of fluid flow, the flexibility of the orifice-forming element producing a progressive increase in the size of the orifice with increasing flow-rate, a first pressure-sensing line connected to the system on the upstream side of the orifice, a second pressure-sensing line connected to the system on the downstream side of the orifice, and the pressure-sensitive element comprises a pressure-differential sensing means connected to the two pressure-sensing lines for sensing the differential in pressure therebetween as the pressure which operates the aforesaid pressure-sensitive element in such manner as to maintain said predetermined flow relation between said flow branches of the system.

2. A fluid flow system according to claim 1 which the flexible orifice-forming element comprises a flexible disc having a central opening and slits radiating outwardly from the central opening.

3. A fluid flow system according to claim 1 in which the flexible orifice-forming element is provided on the downstream side thereof with a restraining wall adapted to limit the expansion of the orifice under maximum flowrate conditions.

4. A fluid flow system according to claim 1 in which the flow control valve maintains a predetermined ratio of fluid flow through at least two of the branches of the flow system.